United States Patent
Kobayashi et al.

(10) Patent No.: US 7,563,421 B2
(45) Date of Patent: Jul. 21, 2009

(54) HYDROMETALLURGICAL PROCESS OF NICKEL OXIDE ORE

(75) Inventors: Hiroshi Kobayashi, Niihama (JP); Hirofumi Shouji, Niihama (JP); Masaki Imamura, Niihama (JP); Yoshitomo Ozaki, Tokyo (JP); Naoyuki Tsuchida, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 608 days.

(21) Appl. No.: 11/125,325

(22) Filed: May 10, 2005

(65) Prior Publication Data

US 2005/0265910 A1    Dec. 1, 2005

(30) Foreign Application Priority Data

May 13, 2004  (JP) ............................. 2004-143537
Apr. 1, 2005   (JP) ............................. 2005-105925

(51) Int. Cl.
*C22D 23/00* (2006.01)

(52) U.S. Cl. .................... 423/140; 423/141; 423/142; 423/150.3; 423/150.4; 423/150.5

(58) Field of Classification Search ................ 423/140, 423/141, 142, 150.3, 150.4, 150.5
See application file for complete search history.

(56) References Cited

U.S. PATENT DOCUMENTS

| | | | | |
|---|---|---|---|---|
| 3,082,080 A | * | 3/1963 | Simons | 423/52 |
| 3,146,091 A | * | 8/1964 | Green | 75/419 |
| 3,720,749 A | * | 3/1973 | Taylor et al. | 423/141 |
| 3,761,566 A | * | 9/1973 | Michal | 423/141 |
| 3,809,549 A | * | 5/1974 | Opratko et al. | 423/140 |
| 3,991,159 A | * | 11/1976 | Queneau et al. | 423/150.4 |

FOREIGN PATENT DOCUMENTS

JP    6-116660    4/1994

OTHER PUBLICATIONS

Tsuchida, et al., "Development of process design for coral bay nickel project" International Laterite Nickel Symposium 2004 (as held during the 2004 TMS Annual Meeting), Charlotte, NC, Mar. 14-18, 2004, pp. 151-160.*

* cited by examiner

*Primary Examiner*—Steven Bos
(74) *Attorney, Agent, or Firm*—Edwards Angell Palmer & Dodge LLP

(57) ABSTRACT

A hydrometallurgical process based on pressure leaching at elevated temperature for recovering nickel from nickel oxide ores, characterized by a simplified and efficient process as a whole, realizing a simplified leaching stage, reduced neutralizer consumption and precipitate production in the neutralization stage, and efficient use of recycled water.

The hydrometallurgical process of the present invention, comprising a leaching stage which stirs the slurried ore in the presence of sulfuric acid at 220 to 280° C. to produce the leached slurry; solid-liquid separation stage which washes the leached slurry in multi-stages to produce the pregnant liquor and leached residue, the former containing nickel and cobalt; neutralization stage which treats the pregnant liquor in the presence of calcium carbonate incorporated to keep the pH level at 4 or less, while suppressing oxidation of the liquor, to produce the neutralization precipitate slurry and mother liquor for nickel recovery, the former containing trivalent iron; and a sulfide precipitation stage which blows hydrogen sulfide gas into the mother liquor to produce the sulfide solution and barren liquor, the former containing nickel and cobalt.

5 Claims, 3 Drawing Sheets

HYDROMETALLURGICAL PROCESS OF NICKEL OXIDE ORE

BACKGROUND OF THE INVENTION

1. Field of the Invention

The present invention relates to a hydrometallurgical process of nickel oxide ores, more particularly a hydrometallurgical process based on pressure leaching at elevated temperature for recovering nickel from nickel oxide ores, characterized by a simplified and efficient process as a whole, realizing a simplified leaching stage and solid-liquid separation stage, reduced neutralizer consumption and precipitate production in a neutralization stage, and efficient use of recycled water.

2. Description of the Prior Art

Recently, pressure acid leaching at elevated temperature (High Pressure Acid Leach) in the presence of sulfuric acid, has been attracting attention as a hydrometallurgical process of nickel oxide ores by virtue of advanced materials developed to efficiently exhibit corrosion resistance at elevated temperature and pressure. This process is more energy-efficient and advantageous costwise than the pyrometallurgical process, which has been commonly adopted for treating nickel oxide ores, because it is an integrated wet stage involving no dry stage, e.g., reduction or drying. Therefore, various approaches, centered by those for the high-pressure acid leaching stage, e.g., for washing a pregnant liquor, have been proposed to establish the more improved process.

Many of these proposals, however, are mainly aimed at improvement of leaching rate of nickel or cobalt, reduction of operational material requirements and recovery of by-products, and few are related to an overall process of nickel oxide ores involving series of stages up to a washing system.

One of the representative pressure acid leaching processes at elevated temperature for recovering nickel, cobalt or the like from nickel oxide ores, leaches a residue from an atmospheric leaching stage with sulfuric acid at elevated temperature and pressure in an oxidative atmosphere; leaches an oxide ore slurry at atmospheric pressure in an acidic atmosphere by sulfuric acid with the pregnant liquor discharged from the above stage; neutralizes the pregnant liquor discharged from the atmospheric leaching stage; and treats the slurry with an alkali sulfide compound to recover nickel or cobalt in the form of sulfide (disclosed by, e.g., JP-A 6-116660 (Pages 1 and 2)).

The above process first leaches a slurried ore with a pregnant liquor containing sulfuric acid at a high concentration from an autoclave in an atmospheric leaching stage. This process has advantages of reduced load in a neutralization stage, brought from consumption of the excessive acid present in a pregnant liquor of the high-pressure acid leaching stage, and improved rate of recovering nickel from the ore. These advantages are due to use of the atmospheric leaching stage. On the other hand, however, the atmospheric leaching stage causes a disadvantage of increased number of facilities for slurry concentration in a process involving a series of stages, e.g., atmospheric leaching, thickener-aided slurry concentration and pressure leaching at elevated temperature, which deteriorate system simplicity and operability of the overall process.

The leached residue from the atmospheric leaching stage is then treated by the pressure leaching stage at elevated temperature, and the resulting pregnant liquor is treated by a series of stages including solid-liquid separation, neutralization and sulfide precipitation to recover nickel and cobalt. JP-A 6-116660, however, is silent on the detailed operating conditions. The leached residue washing stage, for example, normally needs a large quantity of wash water for sufficiently recovering nickel from the residue, which increases the refining cost when fresh wash water is continuously used. The document, however, is silent on the above disadvantage.

In addition, the neutralization stage normally involves a problem of nickel loss in the neutralization precipitate. This loss is caused by water deposited on the precipitate, and locally increased pH level on the neutralizer to form the hydroxide. Hydroxylated nickel is normally recovered with sulfuric acid excessively remaining in the pregnant liquor. In other words, the precipitate produced in the neutralization stage is recycled back to the leached residue washing stage to recover nickel by leaching with sulfuric acid remaining in the pregnant liquor. This, however, redissolves iron hydroxide present in the precipitate. As a result, it should be removed by hydroxylation of iron once again in the neutralization stage, which increases neutralizer consumption. It is therefore desirable to minimize the precipitate recycled back to the leached residue washing stage. JP-A 6-116660, however, is also silent on abatement of the precipitate produced in the neutralization stage.

Under these situations, the pressure leaching process at elevated temperature of nickel oxide ores has been demanded to be further improved in efficiency and simplicity of the overall process by solving problems involved in each of its stages.

SUMMARY OF THE INVENTION

The present invention is developed to solve the above problems. It is an object of the present invention to provide a hydrometallurgical process based on pressure leaching at elevated temperature for recovering nickel from nickel oxide ores, characterized by a simplified and efficient process as a whole, realizing a simplified leaching stage and solid-liquid separation stage, reduced neutralizer consumption and precipitate production in a neutralization stage, and efficient use of recycled water.

The inventors of the present invention have found, after having extensively studied a hydrometallurgical process for recovering nickel from nickel oxide ores to satisfy the above object, that the overall process can be simplified and its efficiency can be improved, when a series of stages including pressure leaching at elevated temperature, solid-liquid separation, neutralization and sulfide precipitation are carried out under specific conditions in such a way to simplify the leaching and solid-liquid separation stages, reduce neutralizer consumption and precipitate production in the neutralization stage, and efficiently use recycled water, achieving the present invention.

The first aspect of the present invention is a hydrometallurgical process for recovering nickel and cobalt from nickel oxide ores, which comprising:

(1) a leaching stage which stirs the slurried ore in the presence of sulfuric acid at 220 to 280° C. to produce the leached slurry, (2) a solid-liquid separation stage which washes the leached slurry in multi-stages to produce the pregnant liquor and leached residue, the former containing nickel and cobalt, (3) a neutralization stage which treats the pregnant liquor in the presence of calcium carbonate incorporated to keep the pH level at 4 or less, while suppressing oxidation of the liquor, to produce the neutralization precipitate slurry and mother liquor for nickel recovery, the former containing trivalent iron, and (4) a sulfide precipitation stage which blows hydrogen sulfide gas into the mother liquor to produce the sulfide and barren liquor, the former containing nickel and cobalt.

The second aspect of the present invention is the process of the first aspect, wherein free sulfuric acid concentration is kept at 25 to 50 g/L in the leaching stage at the end of the leaching operation.

The third aspect of the present invention is the process of the first aspect, wherein the solid-liquid separation stage uses the barren liquor as the wash solution.

The fourth aspect of the present invention is the process of the first aspect, wherein a sulfide seed is dosed to the sulfide precipitation stage.

The fifth aspect of the present invention is the process of the first aspect, wherein the neutralization precipitate slurry is recycled back to the solid-liquid separation stage.

NOTATION

Figure 1:
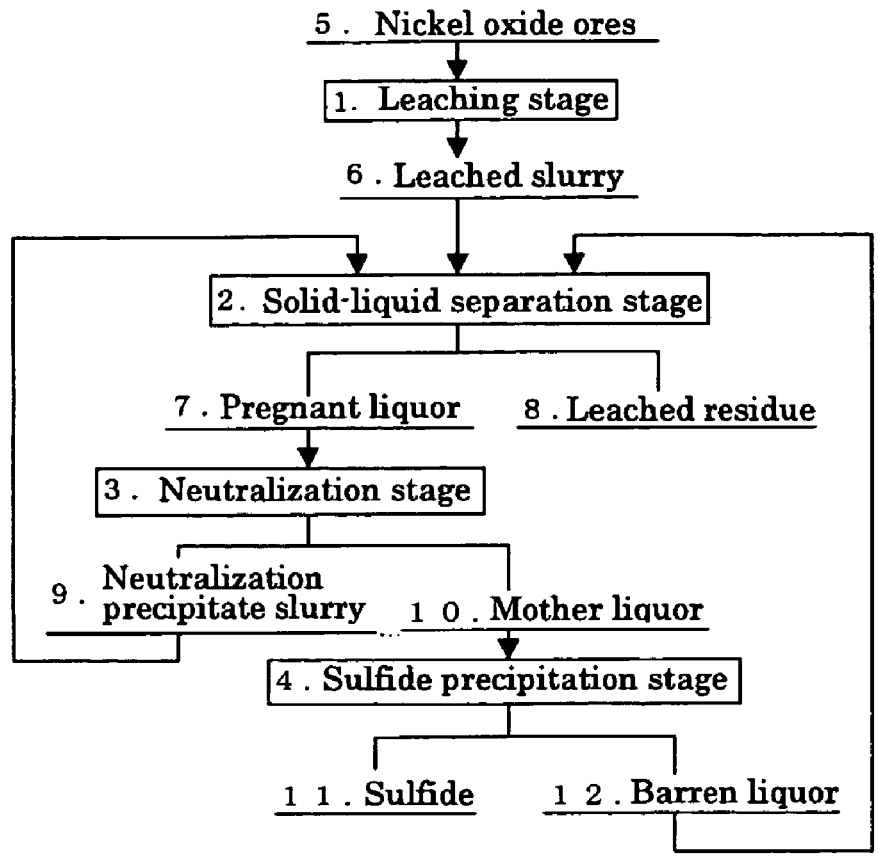
FIG. 1 describes a hydrometallurgical process of nickel oxide ores as one embodiment of the present invention.

1 Leaching stage
2 Solid-liquid separation stage
3 Neutralization stage
4 Sulfide precipitation stage
5 Nickel oxide ores
6 Leached slurry
7 Pregnant liquor
8 Leached residue
9 Neutralization precipitate slurry
10 Mother liquor
11 Sulfide
12 Barren liquor

DETAILED DESCRIPTION OF THE INVENTION

The process of the first aspect of the present invention is simplified in such a way to carry out only the pressure leaching at elevated temperature in the leaching stage. At the same time, it can realize reduced neutralizer consumption and precipitate production in the neutralization stage. As a result, it is simplified and efficient as a overall process, and consequently has a very high industrial value. The second aspect of the present invention can increase true density of the leached residue and improve the solid-liquid separation characteristics. The third aspect of the present invention, in which the solid-liquid separation stage uses the barren liquor as the wash solution, can utilize its pH level to effectively and efficiently recycle wash water. The fourth aspect of the present invention can prevent deposition of the formed sulfide on the vessel walls. The fifth aspect of the present invention, in which the neutralization precipitate slurry is recycled back to the solid-liquid separation stage, can reduce nickel loss to further enhance its advantageous characteristics.

The hydrometallurgical process of the present invention recovers nickel and cobalt from the ores, comprising a series of stages of (1) leaching which stirs the slurried ores in the presence of sulfuric acid at 220 to 280° C. to produce the leached slurry, (2) solid-liquid separation which washes the leached slurry in multi-stages to produce the pregnant liquor and leached residue, the former containing nickel and cobalt, (3) neutralization which treats the pregnant liquor in the presence of calcium carbonate incorporated to keep the pH level at 4 or less, while suppressing oxidation of the liquor, to produce the neutralization precipitate slurry and mother liquor for nickel recovery, the former containing trivalent iron, and (4) sulfide precipitation which blows hydrogen sulfide gas into the mother liquor to produce the sulfide and barren liquor, the former containing nickel and cobalt.

First, the hydrometallurgical process of the present invention is outlined by referring to the attached drawings. FIG. 1 presents a process scheme of a hydrometallurgical process of nickel oxide ores as one embodiment of the present invention.

Referring to FIG. 1, the nickel oxide ores 5 are first treated by the leaching stage 1 with sulfuric acid at elevated temperature and pressure, to produce the leached slurry 6. The slurry 6 is sent to the solid-liquid separation stage 2, where it is washed in multi-stages and separated into the pregnant liquor 7 and leached residue 8, the former containing nickel and cobalt. The pregnant liquor 7 is sent to the neutralization stage 3, where it is neutralized to produce the neutralization precipitate slurry 9 and mother liquor 10 for nickel recovery, the former containing trivalent iron hydroxide. The mother liquor 10 is sent to the sulfide precipitation stage 4, where it is separated into the sulfide 11 and barren liquor 12, the former containing nickel and cobalt.

Next, each stage is described in detail.

(1) Leaching Stage

The leaching stage stirs the slurried nickel oxide ores in the presence of sulfuric acid at 220 to 280° C. to produce the leached slurry composed of the leached residue and pregnant liquor, where it is carried out in an autoclave.

The nickel oxide ores to be treated in the leaching stage are mainly of the so-called laterite ores, e.g., limonite or saprolite ores. Laterite ores contain nickel generally at 0.8 to 2.5% by mass, where nickel is present in the form of hydroxide or silicomagnesian (magnesium silicate). It contains iron at 10 to 50% by mass, where iron is mainly in the form of trivalent hydroxide (goethite), and partly divalent and present in a silicomagnesian mineral. The useful ores for the present invention also include manganese nodules occurring on deep ocean beds and others containing valuable metals, e.g., nickel, cobalt, manganese or copper.

In the leaching stage, nickel, cobalt or the like are leached out in the form of sulfate by the leaching reactions, and the leached iron sulfate is fixed in the form of hematite by the thermohydrolysis reactions proceeding at high temperature, represented by the formulae (1) to (5). However, a liquor of leached slurry contains normally divalent and trivalent iron ions and nickel, cobalt or the like, as iron ion is not fixed perfectly.

[Leaching Reactions]

$$MO+H_2SO_4 \rightarrow MSO_4+H_2O \quad (1)$$

(wherein, M is Ni, Co, Fe, Zn, Cu, Mg, Cr, Mn or the like)

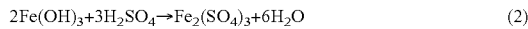
$$2Fe(OH)_3+3H_2SO_4 \rightarrow Fe_2(SO_4)_3+6H_2O \quad (2)$$

$$FeO+H_2SO_4 \rightarrow FeSO_4+H_2O \quad (3)$$

[Thermohydrolysis Reactions]

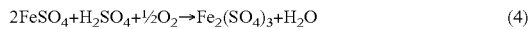
$$2FeSO_4+H_2SO_4+\tfrac{1}{2}O_2 \rightarrow Fe_2(SO_4)_3+H_2O \quad (4)$$

$$Fe_2(SO_4)_3+3H_2O \rightarrow Fe_2O_3+3H_2SO_4 \quad (5)$$

The leaching stage is carried out at 220 to 280° C., preferably 240 to 270° C., because iron is fixed mostly in the form of hematite in this stage, when it is carried out in the above temperature range. At below 220° C., the thermohydrolysis proceeds at a reduced rate, and iron is left dissolved in the reaction solution. As a result, purification load for removing iron from the solution increases, making it very difficult to separate it from nickel. Temperature above 280° C., although accelerating the thermohydrolysis itself, is also unsuitable, because of limited vessel materials for the stage and increased steam cost for keeping increased temperature.

Slurry concentration for the leaching stage is not limited. It is however preferable to keep a leached slurry concentration at 15 to 45% by mass. At below 15% by mass, a larger facility is required to secure the same residence time for leaching, and acid requirement also increases to keep a remaining acid concentration at a desired level. Moreover, nickel concentration of the resulting pregnant liquor decreases. At above 45% by mass, on the other hand, transportation of the high-concentration slurry may become difficult, resulting from clogging of the piping system occurring more frequently and increased energy requirement, although system size can be reduced.

Sulfuric acid input for the leaching stage is not limited. An excessive quantity of the acid is used to leach iron out of ores. For instance, it may be 300 to 400 kg per ton of the ore. Increasing the input beyond 400 kg per ton of the ore is not desirable, because of the increased sulfuric acid cost.

Moreover, the acid input is preferably controlled to keep its concentration at a desired level at the end of the leaching operation. The concentration is not limited, but preferably 25 to 50 g/L, more preferably 35 to 45 g/L. Keeping the concentration in the above range increases true density of the leached residue to stably produce the residue of high density, and improves solid-liquid separability of the residue-containing slurry, which simplifies the subsequent solid-liquid separation stage system.

Sulfuric acid concentration below 25 g/L causes problems in sedimentation of the residue-containing slurry, because the solids are not sufficiently concentrated or suspended solids (hereinafter referred to as SS) excessively remain in the supernatant solution. These problems result from insufficient thermohydrolysis rate, and insufficient dehydration of iron hydroxide to form hematite of lower true density. Increasing the acid concentration above 50 g/L is also undesirable, because it needs the leaching system of higher durability and greatly increases consumption of the neutralizer for acid neutralization.

Next, the relationship between free sulfuric acid concentration at the end of the leaching operation and solid-liquid separability is described by referring to the attached drawings, where the leaching is carried out at elevated temperature and pressure. Insufficient sedimentation in the solid-liquid separation stage mainly results from decreased solid concentration of the settled residue and increased SS. The solid concentration of the settled residue provides an index for water deposited on the residue. It is an important index together with SS quantity in evaluation of sedimentation characteristics.

Figure 4:
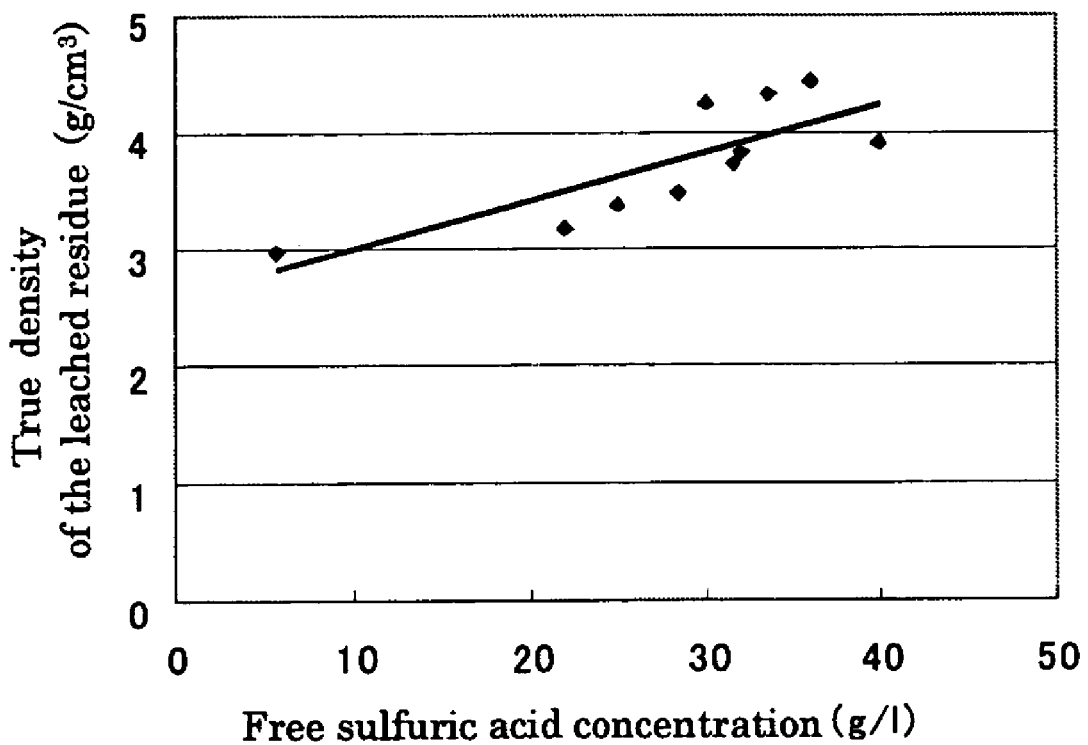
FIG. 4 shows the relationship between free sulfuric acid concentration at the end of the leaching operation and true density of the leached residue in the leaching stage for the present invention.
Figure 5:
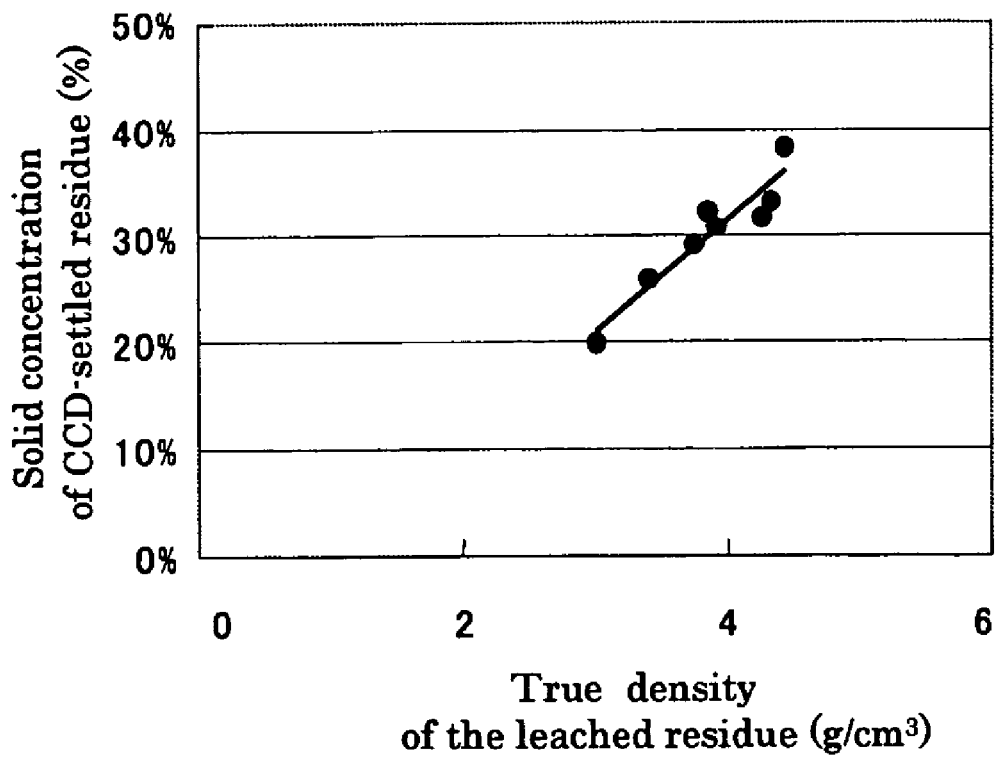
FIG. 5 shows the relationship between true density of the leached residue and solid concentration of the CCD-settled residue in the leaching stage for the present invention.
Figure 6:
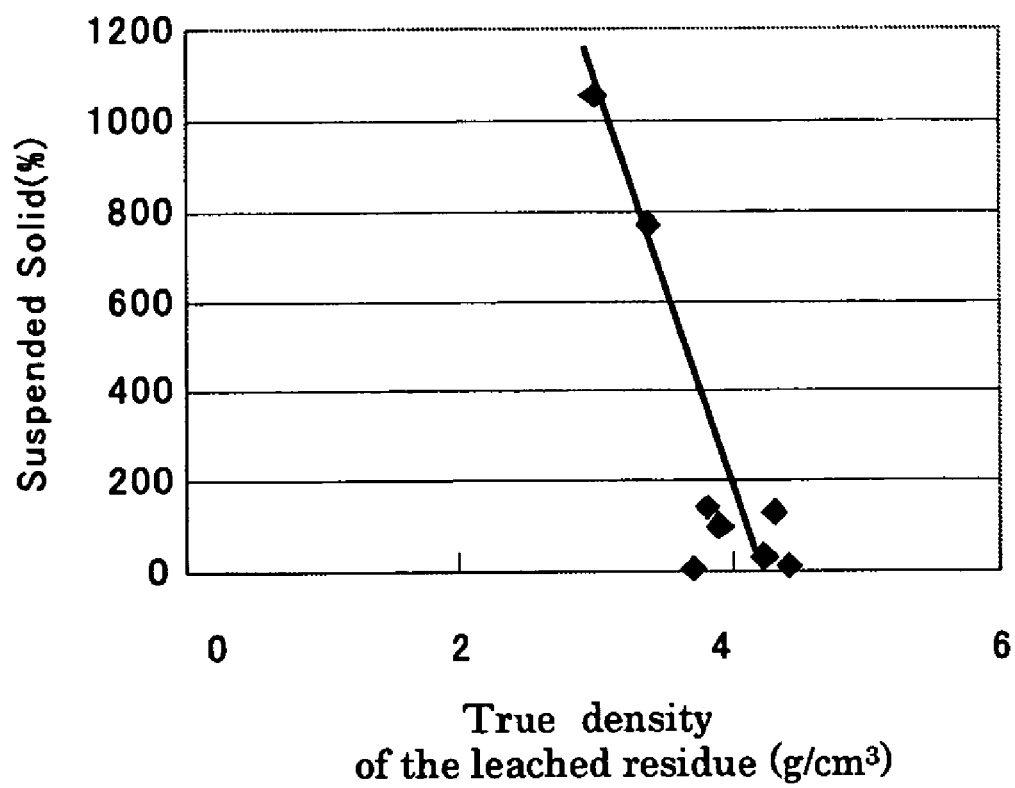
FIG. 6 shows the relationship between true density of the leached residue and SS concentration in the sedimentation stage, both stages being for the present invention.

FIG. 4 presents the relationship between free sulfuric acid concentration at the end of the leaching operation and true density of the leached residue, where limonite ores are leached with sulfuric acid in a pressure vessel under the conditions of temperature: 245° C., free sulfuric acid concentration at the end of the leaching operation: 5 to 40 g/L and leaching time: 1 hour. FIG. 5 presents the relationship between true density of the residue leached under the above conditions and solid concentration of the residue treated by multistage countercurrent decantation washing (CCD). FIG. 6 presents the relationship between true density of the residue leached under the above conditions and SS concentration in the sedimentation operation.

It is found, as shown in FIG. 4, that the leached residue of high density, having an true density of 3.5 g/cm$^3$ or more, can be produced by keeping free sulfuric acid concentration at 25 g/L or more at the end of the leaching operation.

It is also found, as shown in FIG. 5, that there is a linear relationship between true density of the leached residue and solid concentration of the settled residue. Increasing the true density can increase the solid concentration and reduce the solid-liquid separation system size.

As shown in FIG. 6, the solid-liquid separation stage produces large quantities of SS when the leached residue has an true density below 3.5 g/cm$^3$, to cause significantly adverse effects on the sedimentation operation. It is therefore preferable to produce the leached residue of high density, having an true density of 3.5 g/cm$^3$ or more, for the sedimentation operation.

Next, the pressure acid leaching at elevated temperature of nickel oxide ores is described specifically.

Laterite having a composition given in Table 1 are treated with sulfuric acid for 60 minutes at a varying temperature level of 220, 240, 255 or 265° C., where the final sulfuric acid concentration and slurry concentration are kept constant at 40 g/L and 30% by mass.

The sampling is carried out at given time intervals to find nickel leaching rate. The results are given in FIG. 2

TABLE 1

|  | Ni | Co | Fe | Mg | Zn |
|---|---|---|---|---|---|
| % by mass | 1.26 | 0.09 | 42.25 | 2.21 | 0.04 |

Figure 2:
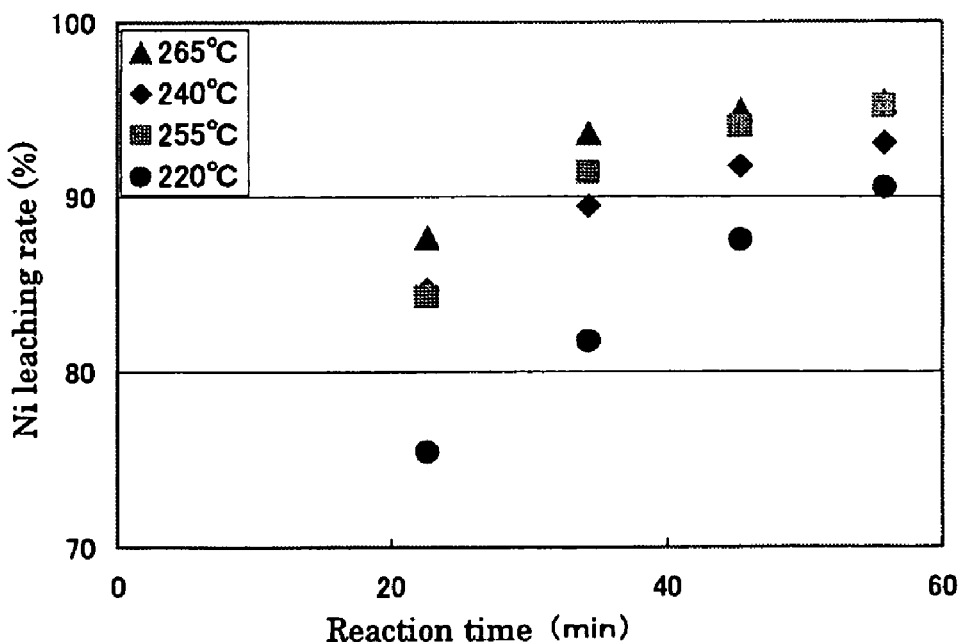
FIG. 2 presents nickel leaching rate in the leaching stage for the present invention.

It is found, as shown in FIG. 2, that a nickel leaching rate of 90% or more can be obtained at a reaction time of 60 minutes, the rate increasing to 95% or more when the leaching is carried out at 240° C. or higher.

The leaching stage produces the leached slurry whose residue portion is mostly composed of hematite. It is difficult to separate the leached slurry into the residue and pregnant liquor by a common filtration system, because the hematite itself is very fine. When an ore containing nickel at a low concentration is massively leached, the leached residue is also produced massively. It is therefore necessary to minimize nickel present in the solution deposited on the leached residue, because it has a significant effect on nickel yield.

(2) Solid-Liquid Separation Stage

The solid-liquid separation stage washes the leached slurry discharged from the leaching stage in multi-stages to produce the pregnant liquor and leached residue, the former containing nickel and cobalt.

The solid-liquid separation stage is effective for the present invention, because it separates nickel or the like out of the leached slurry produced in the leaching stage to recover it in the pregnant liquor. Otherwise, it would be discarded together with the leached residue on which it is deposited. As described above, a common filtration system cannot effectively abate nickel or the like deposited on the residue. Therefore, the residue is washed with wash water to abate nickel deposited thereon. More specifically, the leached slurry is mixed with a wash solution and then treated for solid-liquid separation by a thickener. The slurry is diluted with the wash solution, and then the leached residue is concentrated because it is settled in the thickener. As a result, nickel deposited on the residue can be abated to an extent determined by extent of the dilution. In a commercial operation, thickeners having the above function are connected in multi-stages to enhance the recovery rate.

The method for multi-stage washing in the solid-liquid separation stage is not limited. One of the preferred methods is multi-stage countercurrent decantation washing (CCD), where the slurry and nickel-free wash solution are brought into contact with each other countercurrently. It can increase recovery rate to 95% or more for both nickel and cobalt while abating the fresh wash solution requirement. Overall nickel recovery rate can be effectively improved by the multi-stage washing, when a fresh, nickel-free wash solution is used for each stage. This approach, however, needs a larger solid-liquid separation system and higher cost, resulting from increased wash water requirement. The dilution also deteriorates recovery efficiency, resulting from greatly decreased nickel concentration in the pregnant liquor. On the other hand, the multi-stage countercurrent decantation washing can greatly abate the wash water requirement.

The wash solution is not limited. It can be optionally selected from those containing no nickel and having no adverse effect on the process. It is preferably kept at a pH of 1 to 3, because aluminum, when present in the pregnant liquor, will be converted into bulky aluminum hydroxide at a higher pH level, which possibly deteriorates sedimentation characteristics of the residue in the thickener. Deteriorated sedimentation characteristics mainly result from decreased solid concentration of the settled residue and increased SS. The solid concentration of the settled residue provides an index for water deposited on the residue. It is an important index together with SS quantity in evaluation of the sedimentation characteristics.

The solid concentration of the settled residue is not limited. However, it is preferably 30 to 50% by mass. The concentration below 30% by mass means massive deposition of water on the residue to greatly decrease nickel loss. At above 50% by mass, on the other hand, stirring and transportation of the residue will become difficult. Increased SS quantity will lead to increased purification load for filtration or the like in the subsequent neutralization stage, and hence is undesirable. These indexes for the sedimentation characteristics can be adjusted by use of an anionic flocculant. In general, it is preferably incorporated at 100 to 400 g per ton of the solids. Optimization of the flocculant dose rate in the above range can adjust characteristics of the agglomerate, accelerate its sedimentation and abate SS.

It is particularly preferable to recycle the barren liquor (pH: around 1 to 3), which is produced in the subsequent sulfide precipitation stage, as the wash solution. The solid-liquid separation stage can utilize the pH level of the barren liquor to effectively and efficiently recycle wash water.

(3) Neutralization Stage

The neutralization stage treats the pregnant liquor in the presence of calcium carbonate incorporated to keep the pH level at 4 or less, while suppressing oxidation of the liquor, to produce the neutralization precipitate slurry and mother liquor for nickel recovery, the former containing trivalent iron. It neutralizes the excess acid used for the leaching stage and, at the same time, removes trivalent iron remaining in the liquor.

The neutralization stage is carried out at a pH level of 4 or less, particularly preferably 3.2 to 3.8. At a pH level above 4, nickel hydroxide will be excessively formed.

When trivalent iron remaining in the liquor is removed in the neutralization stage, it is essential not to oxidize divalent iron also present in the liquor. It is therefore important to prevent oxidation of the liquor as far as possible. Blowing of air into the liquor should be avoided, needless to say. Prevented oxidation brings favorable effects of suppressing increase in calcium carbonate consumption, and also in neutralization precipitate yield for removal of divalent iron and hence in nickel loss in the precipitate.

The neutralization stage is carried out preferably at 50 to 80° C. At below 50° C., the precipitate will become excessively fine to exert a negative effect on the solid-liquid separation stage. On the other hand, increasing temperature beyond 80° C. will deteriorate corrosion resistance of the system materials and increase energy cost for heating.

The neutralization precipitate slurry produced in the neutralization stage may be recycled back to the solid-liquid separation stage, as required. This allows nickel to be recovered from the neutralization precipitate slurry. Nickel loss in the neutralization precipitate results from deposition of water and nickel hydroxide on the precipitate, the latter being formed by local reactions on the precipitate. Both cannot be prevented completely. On the other hand, recycling the neutralization precipitate slurry back to the solid-liquid separation stage, which is carried out at a low pH level, allows the leached residue to be washed and, at the same time, accelerates dissolution of nickel hydroxide formed by local reactions. It should be noted, however, that iron hydroxide is partly dissolved together with nickel, which needs a neutralizer to be used once again to fix the leached trivalent iron. It is desirable to prevent oxidation of divalent iron and thereby to abate the neutralization precipitate also in this regard.

(4) Sulfide Precipitation Stage

The sulfide precipitation stage blows hydrogen sulfide gas into the mother liquor to produce the sulfide solution and barren liquor, the former containing nickel and cobalt.

When the mother liquor contains zinc, a stage for selectively separate zinc in the form of sulfide may be added prior to separation of nickel and cobalt each in the form of sulfide. This stage adopts milder sulfide precipitation conditions for selective separation of zinc by controlling the sulfide precipitation and thereby preventing coprecipitation of concomitant nickel, which is present at a higher concentration than zinc.

One of the representative mother liquor contains nickel and cobalt at 2 to 5 and 0.1 to 1.0 g/L, and iron, magnesium, manganese or the like as an impurity, while being kept at a pH of 3.2 to 4.0. Iron, magnesium and manganese are generally present each at several g/L, although their concentrations greatly depend on oxidation-reduction potential for leaching, autoclave operating conditions and ore grade. These impurities are present in the liquor at a relatively high concentration as compared with recovered nickel and cobalt. However, iron, manganese, an alkali metal and alkali-earth metal (e.g., magnesium), which are unstable in the form of sulfide, are not present in the sulfide produced.

Temperature at which the sulfide precipitation stage is carried out is not limited. However, it is preferably 70 to 95° C., more preferably a relatively low temperature of around 80° C. The sulfide precipitation itself is generally accelerated as temperature increases. Temperature above 95° C. causes several problems, e.g., increased energy cost for heating and deposition of the sulfide on the vessel walls resulting from the accelerated reaction.

It is therefore preferable to dose sulfide seed to the sulfide precipitation system to accelerate the reaction at a lower temperature. Use of the seed can accelerate the sulfide precipitation and, at the same time, prevent deposition of the formed sulfide on the vessel walls. These effects result from nucleation of the sulfide on the seed surfaces to facilitate its deposition and thereby to prevent formation of the fine sulfide nuclei in the vessel. Moreover, diameter of the formed particles can be controlled by adjusting seed diameter.

The sulfide seed is not limited, and may be optionally selected from various compounds having a nucleation function. However, a sulfide is preferable, because deposition of the crystal on a dissimilar compound is more difficult. For example, recycling mixed sulfides of nickel and cobalt formed in this process is economically more advantageous. The sulfide dose rate is preferably 100 to 300% by mass on nickel concentration of the liquid.

The sulfide precipitation stage can produce the nickel- and cobalt-containing sulfide solution of low impurity concentration and barren liquor, the latter being at a pH of around 1 to 3, and marginally containing impurities (e.g., iron, magnesium and manganese, which are left unsulfided), and nickel and cobalt lost in the liquor. For example, it contains nickel and cobalt at 40 and 5 mg/L.

As described earlier, the barren liquor causes no hydroxide formation even when recycled as a wash solution for the solid-liquid separation stage, because it contains nickel only sparingly and is kept at a low pH level. It can be recycled, although containing impurities, e.g., iron, magnesium and manganese at a higher concentration than a fresh solution, because it exerts a negative effect to a limited extent on the stages from neutralization onward.

The process of the present invention, comprising a series of the stages described above, can achieve a high nickel recovery yield.

EXAMPLES

The present invention is described in more detail by EXAMPLE of the present invention and COMPARATIVE EXAMPLE, which by no means limit the present invention. Metals were analyzed by ICP emission spectroscopy in these examples. The laterite ores used in these examples were the same as those used for describing the leaching stage, i.e., those having a composition given in Table 1.

Example 1

The laterite ores were treated by the leaching, solid-liquid separation, neutralization and sulfide precipitation stages for the process of the present invention.

(1) Leaching Stage

This stage treated the slurried laterite ores by the pressure leaching at elevated temperature in an autoclave with 98% sulfuric acid under the following conditions:

| [Leaching conditions] | |
|---|---|
| Leaching temperature | 245° C. |
| Leaching time | 60 minutes |
| Final free sulfuric acid concentration | 40 g/L (at the end of the leaching operation) |
| Slurry concentration | 30% by mass |

(2) Solid-Liquid Separation Stage

This stage washed the leached slurry produced in the above stage by a thickener in 7 stages countercurrently under the following conditions. Nickel loss in the residue discharged from this stage was determined. The results are given in Table 2.

TABLE 2

| [Solid-liquid separation conditions] | |
|---|---|
| Solid concentration of the settled residue | 40 and 45% by mass |
| Ni concentration of the pregnant liquor | 7 g/L |
| Wash solution | Water or the barren liquor (Ni concentration: 0.04 g/L, pH: 1.5) discharged from the sulfide precipitation stage |
| Wash ratio | 1.2 to 1.8 (wash solution volume divided by volume of the liquid contained in the residue, serving as an index for wash solution volume) |

| Wash solution | Water | | | | | | Barren liquor |
|---|---|---|---|---|---|---|---|
| Solid concentration of the settled residue (%) | 40 | | | 45 | | | 40 |
| Wash ratio | 1.2 | 1.6 | 1.8 | 1.2 | 1.6 | 1.8 | 1.8 |
| Ni loss (at the 7$^{th}$ stage) (%) | 5.5 | 1.8 | 1.2 | 4.6 | 1.5 | 1.0 | 0.7 |

It is found, as shown in Table 2, that the nickel loss decreases as wash ratio, i.e., wash solution volume relative to residue volume increases, and also that the loss decreases as solid concentration of the settled residue increases, resulting from decreased ratio of the nickel-containing solution deposited on the residue. It is also found that the barren liquor can secure a lower nickel loss than water, conceivably because nickel settled in the form of hydroxide as a result of locally increased pH level in the neutralization stage is redissolved and recovered.

(3) Neutralization Stage

This stage neutralized the pregnant liquor produced in the above stage under the following conditions. Consumption of the neutralizer, neutralization precipitate yield, and Fe, Ca and Ni+Co concentrations of the precipitate were determined. The results are given in Table 3.

| [Neutralization conditions] | |
|---|---|
| Pregnant liquor | Ni concentration: 3.9 g/L, Co concentration: 0.3 g/L, Fe concentration: 5.4 g/L, and sulfuric acid concentration: 4.6 g/L |
| Reaction solution volume | 2 L |
| Reaction temperature | 60° C. |
| Reaction pH | 3.2 |
| Neutralizer | 25% by mass calcium carbonate slurry |
| Reaction time | 1 hour |

TABLE 3

|  | Air blowing | Neutralizer consumption (g) | Neutralization precipitate yield (g) | Grade of Neutralization precipitate (% by mass) | | |
|---|---|---|---|---|---|---|
|  |  |  |  | Fe | Ca | Ni + Co |
| EXAMPLE 1 | No | 27.8 | 31 | 19 | 15 | 3 |
| COMPARATIVE EXAMPLE 1 | Yes | 36.2 | 40 | 27 | 11 | 2 |

It is found, as shown in Table 3, that the neutralization system with no air blowing exhibits a lower precipitate yield, nickel loss and neutralizer consumption than with air blowing, which is described later. These results indicate that the deposition-caused nickel loss can be minimized in the neutralization step in which no iron is oxidized.

(4) Sulfide Precipitation Stage

This stage blew hydrogen sulfide gas into the mother liquor produced in the above stage for sulfiding, and concentration of nickel remaining in the barren liquor was determined. The results are given in FIG. 3.

| [Sulfiding conditions] | |
|---|---|
| Mother liquor | Ni concentration: 3.28 g/L, pH: 3.5 |
| Reaction temperature | 80 and 90° C. |
| Sulfide seed | Mixed sulfides, dosed at 200 to 300% by mass on nickel concentration of the liquid. |
| Reaction time | 1 hour |

Figure 3:
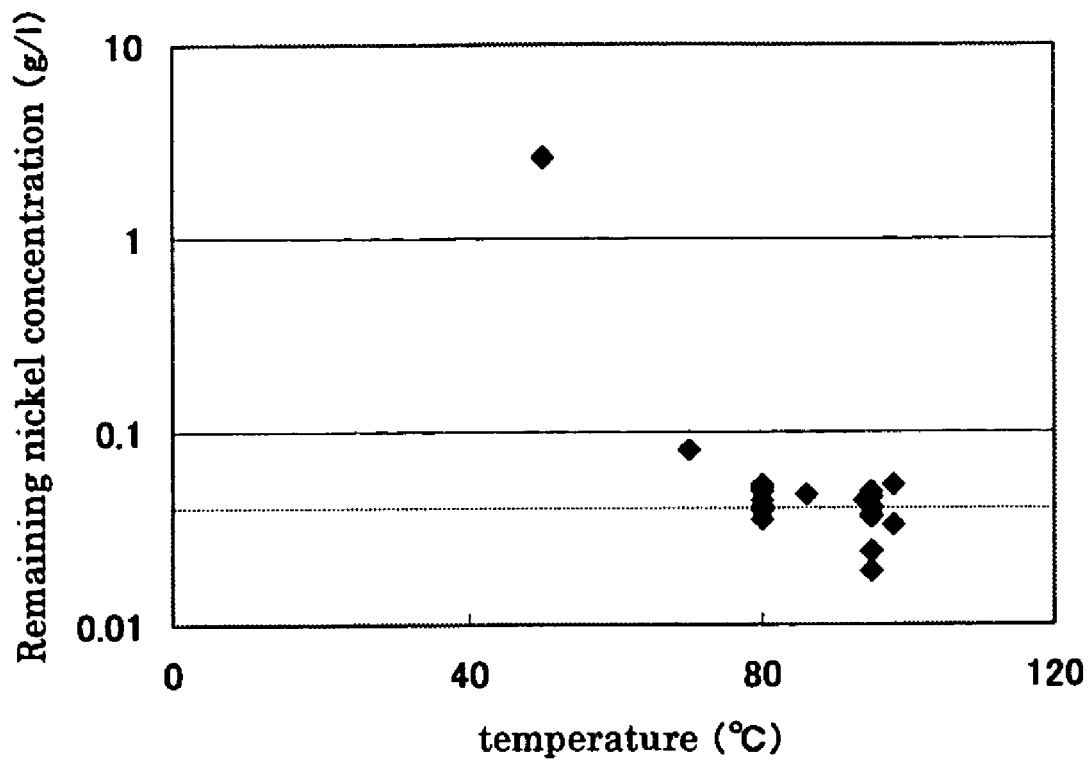
FIG. 3 describes concentration of nickel remaining in the barren liquor in the sulfide precipitation stage in EXAMPLE 1.

It is found, as shown in FIG. 3, that a target concentration (0.04 g/L) of nickel remaining in the barren liquor can be essentially achieved even at a relatively low reaction temperature of around 80° C., when the sulfide seed is dosed at 200 to 300% by mass.

Comparative Example 1

The pregnant liquor prepared under the same conditions as those for EXAMPLE 1 was neutralized under the following conditions. Consumption of the neutralizer, neutralization precipitate yield, and Fe, Ca and Ni+Co concentrations of the precipitate were determined. The results are given in Table 3.

| [Neutralization conditions] | |
|---|---|
| Pregnant liquor | Ni concentration: 3.9 g/L, Co concentration: 0.3 g/L, Fe concentration: 5.4 g/L, and sulfuric acid concentration: 4.6 g/L |
| Reaction solution volume | 2 L |
| Reaction temperature | 60° C. |
| Reaction pH | 3.2 |
| Neutralizer | 25% by mass calcium carbonate slurry (calcium carbonate quantity: 36.2 g) |
| Reaction time | 1 hour |
| Air blowing rate | 1 L/minute (per 2 L of the liquor) |

It is found, as shown in Table 3, that air blowing increases precipitate yield and neutralizer consumption, resulting from iron being totally converted into trivalent iron hydroxide and settled.

It is apparent, as described above, that the process of the present invention is suitable as the one based on leaching carried out at elevated temperature and pressure, which is adopted as a hydrometallurgical process of nickel oxide ores. The process of the present invention can realize a simplified leaching stage, and reduced neutralizer consumption and precipitate production in a neutralization stage. As such, it is a simplified and efficient process as a whole.

What is claimed is:

1. A hydrometallurgical process for recovering nickel and cobalt from nickel oxide ores, comprising:
    (1) a leaching stage which stirs the slurried ore in the presence of sulfuric acid at 220 to 280° C. to produce leached slurry,
    (2) a solid-liquid separation stage which washes the leached slurry in multi-stages to produce pregnant liquor and leached residue, the pregnant liquor containing nickel and cobalt,
    (3) a neutralization stage which treats the pregnant liquor in the presence of calcium carbonate incorporated to keep the pH level at 3.2 to 3.8, while suppressing oxidation of divalent iron present in the liquor, to produce neutralization precipitate slurry and mother liquor for nickel recovery, the neutralization precipitate slurry containing trivalent iron, and
    (4) a sulfide precipitation stage which blows hydrogen sulfide gas into the mother liquor to produce sulfide and barren liquor, the sulfide containing nickel and cobalt.

2. The process according to claim 1, wherein free sulfuric acid concentration is kept at 25 to 50 g/L in the leaching stage at the end of the leaching stage.

3. The process according to claim 1, wherein the solid-liquid separation stage uses the barren liquor as the wash solution.

4. The process according to claim 1, wherein a sulfide seed is dosed to the sulfide precipitation stage.

5. The process according to claim 1, wherein the neutralization precipitate slurry is recycled back to the solid-liquid separation stage.

* * * * *